Sept. 6, 1966    B. K. DAVIS    3,271,558
SPECTRAL METHOD FOR MONITORING ATMOSPHERIC CONTAMINATION
OF INERT-GAS WELDING SHIELDS
Filed Feb. 19, 1965    2 Sheets-Sheet 1

INVENTOR.
BILLY K. DAVIS
BY
ATTORNEYS

United States Patent Office 3,271,558
Patented Sept. 6, 1966

3,271,558
SPECTRAL METHOD FOR MONITORING ATMOSPHERIC CONTAMINATION OF INERT-GAS WELDING SHIELDS
Billy K. Davis, Huntsville, Ala., assignor to the United States of America as represented by the Administrator of the National Aeronautics and Space Administration
Filed Feb. 19, 1965, Ser. No. 434,143
14 Claims. (Cl. 219—131)

The invention described herein may be manufactured and used by or for the Government of the United States of America for governmental purposes without the payment of any royalties thereon or therefor.

This invention relates to the application of an emission spectroscopy to the monitoring of inert-gas metal-arc welding shields for atmospheric and/or material contaminations. More particularly, this invention relates to the continuous monitoring of both nonconsumable and consumable metal-arc welding processes for the presences of given contaminating substances by using the relatively low voltage welding arc as a light source coupled with special spectrographic techniques thereby providing a means for determining and controlling both the quality of the weld joint being formed and the components being used.

In the past it has been the practice in fabricating most welded structures to first form the complete weld joint or bead and then test the acceptability of the joint by some suitable technique such as, for example, by X-ray analysis. In those cases where a faulty weld joint or bead was detected a corrective procedure was undertaken which consisted of removing the defective bead and rewelding the joint. This procedure of welding, testing and rewelding was repeated throughout the structure until all weld joints were of acceptable quality.

Although the prior method of fabricating and testing welded structures has been acceptable where relatively large, heavy structures are involved this method has been found to be of only limited value in the emerging aerospace field. As is well known, most structures of the type used aboard aerospace vehicles are fabricated from so called exotic, thin, hard to work materials and often involves the forming of numerous irregular weld curves. For example, the liquid oxygen and kerosene tanks of the S–IC booster stage of the Saturn V rocket are assembled from small sections of special aluminum in a welding operation requiring more than one and one-half miles of seam. Thus the feasibility of checking, milling out and replacing a defective weld bead, especially one of substantial length, by this prior method is highly questionable. To make matters even more difficult, the welds used on most aerospace vehicles must be perfect since Quality Assurance inspectors reject any sections containing tiny crack-like defects or other minute flaws. In fact, in most cases a faulty weld seam of any appreciable length results in the total loss of a structure since to correct the seam would reduce the reliability of the structure to a dangerous and unacceptable level through the adverse effect of metal fatigue, shrinkage, etc.

Thus the steadily growing requirements for better weld joints has resulted in a concentrated effort being initiated to extend the art and science of welding. As might be expected, particular emphasis has been placed upon determining how the overall quality of the weld seam, and especially the weld bead per se, can be improved. It was also realized early in the research programs leading to the development of various aerospace structures that some method or system was necessary whereby it could be determined during the welding operation if the weld joint being formed was of acceptable quality. The employment of such a system would permit the welding operation to be continuously monitored and immediately stopped in the event circumstances arose which indicated a faulty weld seam was being formed. This system would also permit appropriate remedial steps to be taken to correct the welding operation before a long, unacceptable weld seam was formed that would necessitate either discarding the total structure or performing expensive corrective steps thereon.

According to this invention a method and system has been provided which is capable of not only continuously checking the quality of the weld joint as it is being formed, but of also automatically signaling when corrective steps are required to maintain the weld operation within an accepted range. The operation of this system is based on the fact that most faulty weld seams are caused by contamination within the weld zone. If the type and quantity of the contaminant present within the weld zone at any given moment can be determined an accurate prediction can be made as to the quality of the weld seam being formed. Therefore, the system per se consists basically of a spectrograph for detecting the type of contaminating material present in the weld zone and a readout unit for indicating the quality of the weld seam being formed.

The spectrographical detection portion of the system includes a modified spectrograph that is focused upon the metal-arc of the welding process. As the various materials within the weld area are vaporized by the intense heat of the welding arc, a spectral analytical line corresponding to each of these materials is formed within the spectrographical detector. The quantitative detector portion of the system is preferably formed of a plurality of photomultiplier tubes and associated control circuits positioned so as to pick up the spectral lines emanating from the spectrograph. Thus, since the intensity of the spectral analytical lines produced by a welding arc varies proportionally to the amount of the contaminates within the weld zone, the amount as well as the specific type of contaminates within the area is readily obtained.

Therefore, a primary object of this invention is to provide a method and apparatus for determining the type and quantity of various materials existing within a weld area.

Another object of this invention is to provide a method and apparatus for continuously monitoring both nonconsumable and consumable metal-arc welding processes for determining and controlling the quality of the weld joint being formed.

These and other objects and advantages of this invention will be more apparent upon reference to the following specification, appended claims, and drawings wherein:

Figure 1:
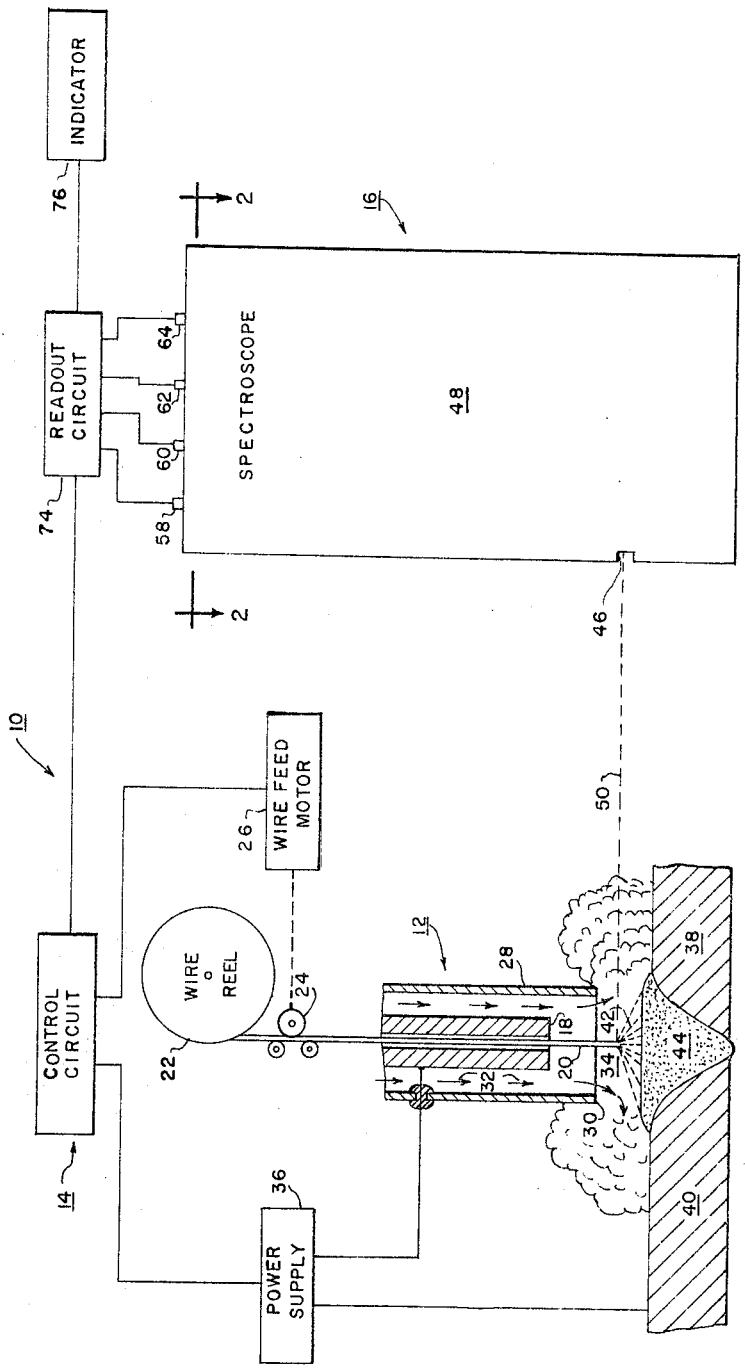
FIGURE 1 illustrates one way in which the welding and spectroscope monitoring units can be arranged to form a working embodiment of the present invention.

With continued reference to the accompanying figures wherein like numerals designate similar parts throughout the various views, and with initial attention directed to FIGURE 1, reference numeral 10 designates a continuously monitored arc welding system. For purposes of explanation, the monitored welding system 10 can be broken down into three main units. Namely; the arc welding unit 12, the control unit 14, and the spectroscope monitoring unit 16.

As seen in FIGURE 1, the welding unit 12 is of a somewhat conventional type that consists of an electrical contact tube 18 through which a consumable metal wire or electrode 20 is fed from a storage reel 22. Feed rollers 24, which are driven by an adjustable speed wire feed motor 26, are employed for driving the metal wire through the contact tube 18 at a predetermined rate. A substantially cylindrical spaced housing or nozzle 28, which has escape ducts or apertures 30 formed in the lower peripheral edge thereof, is positioned around the contact tube 18. An inert gas, as represented by the arrowheads 32, is induced into the top of the housing 28 (not shown) so that the space enclosed by the housing is purged of any deleterious gases that may be found therein; thus ideally leaving the welding zone 34 shrouded with an inert gas shield.

An adjustable power supply 36 is connected between the consumable wire 20 and workpieces 38–40 for applying a selected voltage between the tip or end of the consumable wire 20 and the weld zone 34. With the power supply 36 set to furnish the desired arc voltage and weld current, and with the feed rate of the metal wire 20 properly set, an electrical weld arc (as represented by the broken lines 42) will be established in the weld zone 34 thereby producing a molten puddle 44 for welding the workpieces 38–40 together.

The control circuit 14 is electrically connected to both the wire feed motor 26 and power supply 36 for simultaneously adjusting these two units in respect to one another thereby assuring that a correct arc is established and maintained. This control circuit 14 can be of any suitable type as long as it is capable of supplying a proper sequence of signals to the welding unit 12.

The spectroscope monitoring unit 16 can be of any suitable type that is capable of analyzing light in the desired frequency range by separating it into its component rays. Such an instrument usually includes a limiting aperture or slit 46 in its housing 48 through which a beam of light 50 to be analyzed may enter. In the present instance the light to be analyzed is generated by the welding arc 42 existing in the welding zone 34 and, if necessary, may be directed into the slit 46 by means of a polished surface or mirror.

Figure 2:
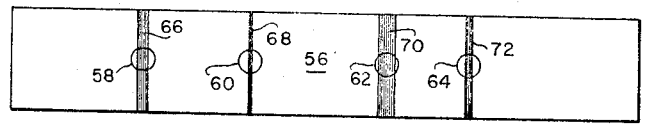
FIGURE 2 is a cross sectional view of the spectrographical detection portion of the invention taken along line 2—2 of FIGURE 1.

As is well known, the spectroscope 16 contains some type of prism or grating element which diffracts the light entering the slit 46. The individual rays produced by this diffractory step are then focused on a spectra surface or plate of a recording system. FIGURE 2 illustrates the modified spectra plate 56 employed in the spectroscope 16 upon which the emission spectra produced by the diffractory of the light rays 50 is focused. For reasons that will be more fully explained hereinbelow the light sensitive ends of four photoelectric responsive elements or tubes 58–64 are shown mounted on the plate 56. These photoelectric tubes are preferably of the photomultiplier type and are mounted so that their location on the plate 56 can easily be moved or adjusted thus permitting one tube to be aligned with each line of the spectra that is to be monitored. The output from each photomultiplier tube is electrically connected to a readout circuit 74 (see FIGURE 1). This readout circuit may be of any suitable type that is capable of sensing the amplitude and/or combination of inputs being applied thereto. The output signal from the readout circuit 74 is preferably connected to both a visual indicator circuit 76, such as a meter movement or other suitable device, and to the electrical control circuit 14.

The operation of the continuous monitoring welding system can be explained in substantially the following manner. First the detector elements 58–62 on the spectra plate 56 of the spectroscope monitoring unit 16 are adjusted or selected to respond to those contaminating materials whose presence are to be determined. For purposes of illustration it will be assumed that the contaminating materials to be detected in the present instance are hydrogen, oxygen and nitrogen since these atmospheric elements are those which usually create the most difficulty in welding of aerospace structures. Thus the spectroscope monitoring unit 16 must respond to the analytical lines produced by hydrogen at 6542.8 A. or 12.09 e.v. (line 66 in FIG. 2); oxygen at 7771.9 A. or 10.73 e.v. (line 68); and nitrogen at 8216.5 A. or 11.84 e.v. (line 70).

For purposes of calibration and control an analytical line 72 of a known element must also be included. Since the shield gas 32 of the welding unit 12 generally consists of a mixture of argon and helium, the analytical line of argon, which is 7147.5 A. or 13.3 e.v., was chosen. The use of such a calibration line is necessary to indicate whether a variation in intensity of a given line, as it is detected by the elements 58–72, is due to a change in the concentration of the material within the weld area 34 or is due to a change in the intensity of the weld ark 42. Thus it is seen that the use of such a calibration line results in the spectroscope monitoring unit 16 being rendered totally insensitive to any variation in the intensity of the welding ark that may occur.

A Jarrell-Ash 3.4-meter Ebert mount spectroscope (model JA–7120) with a 15,000 line/inch plane grating blazed for 4000 A. in the first order is responsive to the analytical lines 66–72 and therefore can be used for unit 16.

From the foregoing it can be seen that as the degrees of contamination within the arc zone 34 increases, the intensity of the particular analytical lines will increase thereby increasing the output of the corresponding photomultiplier by a proportional amount. The readout circuit 74, which is electrically connected to the photomultiplier tubes 58–64, serves to compare and amplify the signals from the tubes to a valve sufficiently high to drive the indicator unit 76 and control circuit 14. In addition to the comparison and amplification functions, the output circuit can be constructed as a conventional logic type circuit for determining what element, or combination of contaminating elements, are present in the weld zone, or as a summing network for totaling the percent of the contaminants. The use of such a readout circuit permits the automatic shutting down of the welding machine whenever a given level and/or combination of contaminating elements are present in the weld zone which might cause a faulty weld joint to be formed.

The reference information or working curves, which are necessary for the analysis of unknown contaminating elements or quantities thereof as they are represented by the output signals received from the photomultiplier tubes 58–64, are readily obtained from previously prepared calibration curves. One method by which these calibration curves can be prepared is by adding known quantities of contaminants in the form of a gas to the inert gas shield of the welding unit 12 and recording the output obtained thereby as a standard blank is being welded. As many of the remaining parameters of the welding unit, such as current, arc length, and composition of the matrix (major elements present), should be held as constant as possible during the production of the calibration curves. A mixture of argon and helium flowing at a rate of 20 c.f.h. has been found to be quite acceptable as the shield gas 32 to which the contaminants are to be added. The use of pure argon as a shield gas is generally not recommended due to its very high background emission while a pure helium shield is overly sensitive to contaminants. In a given application the proper mixture of helium and argon should be established and adhered to.

Figure 3:
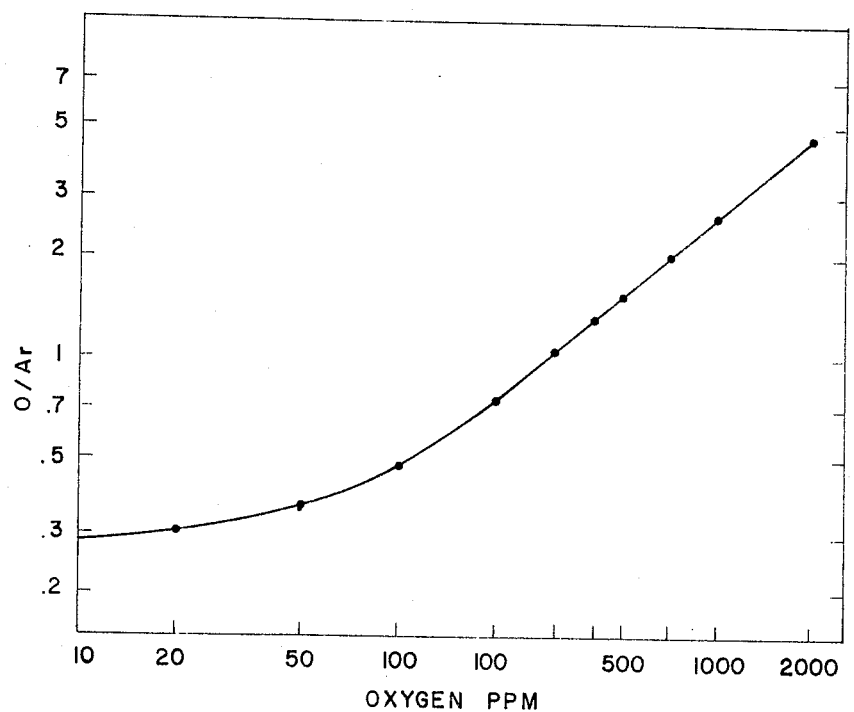
FIGURE 3 is a graph showing the relation of intensity and proportion of a contaminate such as oxygen present in the welding zone.

As will be apparent, calibration curves must be prepared for each contaminant that is to be monitored. A typical calibration curve for oxygen, which was prepared in the above described manner and which illustrates the proportional increase in intensity of the analytical line as the concentration of oxygen increases, is shown in FIGURE 3.

In certain instances it may be desirable to replace the electrical readout system, including the photomultiplier tubes, with a photographic emulsion that is sensitive to the frequency of the analytical line being observed. When such photographic emulsions are used they are preferably removably secured to the spectra plate 56 so as to receive and record the analytical lines falling thereon thus giving a permanent record of the contaminants present. After removal and development of the photographic emulsions, a comparator microphotometer can be used to interpret the photoprints.

From the foregoing it can be seen that since the analytical lines for most contaminants become proportionally more intense as increasing quantities of the contaminants enter the welding zone, the use of a spectrographic detecting and readout technique permits both a determination of the type as well as the quantity of the contaminants present. The use of a readout and control circuit not only permits the type and amount of these contaminants to be continuously monitored, but the welding operation can be instantly halted if the contaminant condition is such as to cause a faulty weld seam to be formed.

The invention may be embodied in other specific forms without departing from the spirit or essential characteristic thereof. The present embodiment is therefor to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. The method of monitoring and controlling an arc welding system, comprising the steps of:
   (a) positioning the welding means of said welding system above the work piece to be welded;
   (b) applying an electrical potential between said welding means and said work piece for establishing a welding arc of such intensity that the foreign materials present within the welding zone are brought to a glowing state;
   (c) spectroscopically analyzing said glowing materials as the welding process progresses for the presences of contaminating materials that would adversely affect the quality of the weld bead being formed; and
   (d) applying the information derived from said spectroscopic analysis to the control circuit of said welding system for controlling the welding process so that a suitable weld bead is continuously formed.

2. The method of controlling an arc welding system, comprising the steps of:
   (a) spectroscopically analyzing the radiation emitted from the arc welding zone of the welding system for radiation characteristics indicating the presences of contaminating materials within the zone which would produce defective weld beads, and
   (b) applying the information derived from said spectroscopic analysis to a control circuit of said welding system for adjusting the operation of said welding system in accordance with the contaminating materials found to exist within said welding zone so that a suitable weld bead is continously formed.

3. The method of monitoring and controlling an arc welding system, comprising the steps of:
   (a) positioning the welding head of said welding system above the work piece to be welded;
   (b) applying an electrical potential between said welding head and said work piece for establishing a welding arc thereby heating those contaminating materials present within the welding zone to a glowing state so as to cause said materials to emit radiation;
   (c) introducing an easily heated reference material into said welding zone for establishing a reference radiation characteristic;
   (d) measuring and comparing the intensity of the emitted radiation of said glowing materials and said reference material as the welding process progresses; and
   (e) applying the information derived from said comparison to the control circuit of said welding system for controlling the welding process so that a suitable weld bead is continuously formed.

4. In an arc welding machine for welding wherein a metallic rod is fused and incorporated in the work, the combination of:
   (a) means for establishing a welding zone in which said rod is fused;
   (b) detection means operatively associated with said welding zone for detecting the presences of contaminating materials of the type that causes the formation of faulty weld beads;
   (c) indication means connected to said detection means for indicating when said contaminating materials are detected by said detecting means, and
   (d) control means connected between said detecting means and said means for establishing a welding zone, said control means being adapted to vary said welding zone in accordance with the output signal produced by said detecting means thereby assuring the formation of an acceptable weld bead.

5. An arc welding machine as defined in claim 4 wherein said detection means is a spectroscope.

6. An arc welding machine as defined in claim 4 wherein said indicator means is of the photographic type.

7. A machine for welding wherein a metallic rod is fused and incorporated in the work, comprising:
   (a) circuit means for establishing a weld arc between said rod and said work;
   (b) control means connected to said circuit means for controlling said weld arc;
   (c) radiation detection means positioned so as to receive at least a portion of the radiation emitted by said arc, said radiation detection means being adapted to analyze the radiation from said arc for those frequencies indicating the presence of a contaminating material within said arc of the type which causes a faulty weld bead to be formed; and
   (d) means connected between said control means and said radiation detection means for causing said control means to be actuated when the presence of a contaminating material is detected thereby adjusting said weld arc in such a manner as to prevent the formation of a faulty weld bead.

8. A machine for welding as defined in claim 7 wherein said radiation detection means is a spectroscope monitoring unit.

9. A machine for welding as defined in claim 8 wherein said spectroscope monitoring unit includes photoelectric responsive elements for converting those detected radiation frequencies indicating the presence of a contaminating material into an electrical signal.

10. A machine for welding as defined in claim 9 wherein the effective position of said photoelectric responsive elements can be adjusted so as to permit the response of said spectroscope monitoring unit to be adjusted over a predetermined spectra range.

11. A machine for welding wherein a metallic rod is fused and incorporated in the work, comprising:
   (a) circuit means for establishing a weld arc between said rod and said work;
   (b) control means connected to said circuit means for controlling said weld arc;
   (c) radiation detection means positioned so as to receive at least a portion of the radiation emitted by said arc, said radiation detection means being adapted to analyze the radiation from said arc for those frequencies indicating the presence of a contaminating material within said arc of the type which causes a faulty weld bead to be formed;
   (d) a reference radiation frequency producing means operatively associated with said radiation detection means for continuously applying a calibrating frequency to said radiation detecting means; and
   (e) means connected between said control means and said radiation detection means for causing said control means to be actuated when the presence of a contaminating material is detected thereby adjusting said weld arc in such a manner as to prevent the formation of a faulty weld bead.

12. A machine for welding as defined in claim 11 wherein the intensity of the calibrating frequency produced by said reference radiation frequency producing means is proportioned to the intensity of said weld arc thereby rendering the output of said radiation detecting means independent of the variation in intensity of said weld arc.

13. A machine for welding as defined in claim 12 wherein said reference radiation frequency producing means is a calibrational material introduced into said weld arc.

14. A machine for welding as defined in claim 13 wherein said calibrational material is a shield gas.

References Cited by the Examiner

UNITED STATES PATENTS

| | | | |
|---|---|---|---|
| 1,962,366 | 6/1934 | Skala | 88—14 |
| 2,031,288 | 2/1936 | Tripp | 219—135 |
| 2,089,015 | 8/1937 | Buckman et al. | 113—59 |
| 2,252,508 | 8/1941 | Hoff | 88—14 |
| 2,339,754 | 1/1944 | Brace | 88—14 |
| 2,646,492 | 7/1953 | Ballard | 219—75 |
| 3,144,551 | 8/1964 | Webb et al. | 250—43.5 |
| 3,146,822 | 9/1964 | Ray | 158—28 |

References Cited by the Applicant

UNITED STATES PATENTS

| | | |
|---|---|---|
| 2,194,520 | 3/1940 | Darrah. |
| 2,991,684 | 7/1961 | Wever et al. |
| 3,025,745 | 3/1962 | Liston. |

RICHARD M. WOOD, *Primary Examiner.*